United States Patent [19]

Kagawa

[11] 3,915,671

[45] Oct. 28, 1975

[54] PROCESS FOR MAKING A POROUS UNSATURATED POLYESTER RESIN BONDED GRINDING TOOL

[75] Inventor: Fumio Kagawa, Shiojiri, Japan

[73] Assignee: Showa Denko Kabushiki Kaisha, Tokyo, Japan

[22] Filed: Feb. 13, 1974

[21] Appl. No.: 442,060

[30] Foreign Application Priority Data

Feb. 20, 1973  Japan.............................. 48-19720

[52] U.S. Cl..................................... 51/296; 51/298
[51] Int. Cl.².......................................... B24D 3/32
[58] Field of Search............................. 51/296, 298

[56] References Cited
UNITED STATES PATENTS

| | | |
|---|---|---|
| 3,540,869 | 11/1970 | Bauer.................................... 51/298 |
| 3,631,638 | 1/1972 | Yoshikawa............................ 51/298 |
| 3,804,607 | 4/1974 | Jungell.................................. 51/298 |

*Primary Examiner*—Donald J. Arnold
*Attorney, Agent, or Firm*—Sherman & Shalloway

[57] ABSTRACT

A porous, cured unsaturated polyester resin bonded grinding tool having very fine pores uniformly dispersed therein is produced by molding a homogeneous mixture comprising abrasive grains, a water-in-oil emulsion of an uncured unsaturated polyester resin and a curing catalyst to form a mold of the intended grinding stone shape, curing the unsaturated polyester resin contained in the mold, and drying the mold to remove the water therefrom.

3 Claims, No Drawings

PROCESS FOR MAKING A POROUS UNSATURATED POLYESTER RESIN BONDED GRINDING TOOL

This invention relates to a process for making a porous grinding tool and, in particular, to a process for making an unsaturated polyester resin bonded grinding wheel such as a grinding wheel which, having fine and uniformly distributed pores, excels in grinding properties.

As mechanical grinding tools, various vitrified grindstones, as well as elastic grindstones such, for example, as the bakelite or phenolic resin bonded stones have been known. These stones were in all instances not of the finely porous type and were quite hard, and they were principally used for metal removal. Thus, it was difficult to obtain a mirrorlike finish of the ground material. On the other hand, as a typical example of the porous stones, the polyvinyl acetal resin bonded grindstone is known. This stone is used for polishing purposes, i.e., it is used to finish the surfaces of the relatively soft materials such as aluminum, soft steel and stainless steel.

The porous, polyvinyl acetal resin bonded grindstone is made in the following manner. Polyvinyl alcohol is dissolved in an aqueous mineral acid solution, after which abrasive grains are added to the solution with or without adding a chemical blowing agent. Next, after adding formalin and thorough stirring, the mixture is poured into a mold and allowed to stand under mild heating to effect its cure. The pores are formed by the assistance of a chemical blowing agent or by mechanical agitation. Since the resulting stone is porous and its elasticity is great, there is less loading as well as heat clogging, with the consequence that it is suitably used as a stone for finishing the surface of the relatively soft materials. However, in its use its attrition is exceedingly great. For instance, when soft steel is ground, its grinding ratio (amount ground/amount of stone wear) is exceedingly small, being about 0.1. Further, the size of the pores is quite large and their distribution is not uniform. This stone also possesses the following shortcomings. One is that since the adhesion between the abrasive grains and the binder is poor, the mechanical strength of the stone is low. Another is that the binder lacks water resistance, with the consequence that cooling water cannot be used during the grinding operation. For enhancing the strength and hardness of such a porous grinding tool, it has also been suggested to react polyvinyl acetal with a compound that can form a resinous substance by reacting with an aldehyde, such as in the case of phenol, melamine or the methylol compounds thereof to thereby increase the hardness of the binder. However, since in all instances the formation of the pores is accomplished by means of either mechanical agitation or a chemical blowing agent, difficulty is experienced in obtaining a grinding tool having uniform and fine pores. Moreover, since the acetalization of polyvinyl alcohol is carried out in a mineral acid of high concentration, there is the necessity of washing and removing the mineral acid after completion of the molding. As noted hereinabove, the resin bonded grinding tools having polyvinyl alcohol acetal as their base are not fully satisfactory in respect of their physical properties. In addition, not only is their manufacturing process complicated but also their yield is not necessarily high.

The present invention provides a process by which it becomes possible to readily make an improved porous, resin bonded grinding tool possessing excellent properties and without the shortcomings that were encountered in the case of the conventional porous, resin bonded grinding tools.

The process for making a porous, resin bonded grinding tool according to this invention is characterized by molding a homogeneous mixture comprising abrasive grains, a water-in-oil emulsion of an uncured unsaturated polyester resin and a curing catalyst for the unsaturated polyester resin to form a mold of the intended grinding tool shape, curing the unsaturated polyester resin contained in the mold, and drying the so obtained mold to remove the water therefrom.

The invention process does not include any complicated steps whatsoever, and the resulting grinding tool has the following advantages:

a. It is a porous grinding tool having very fine and uniformly distributed pores. The size of the pores is about 0.1 – 10 microns. By comparison with the size of the pores of the conventional porous grindstones, this is exceedingly fine. This is due to the fact that the foregoing water-in-oil emulsion used in carrying out the mold is homogeneously mixed with the abrasive grains and that the pores are formed by the minute particles of water contained in the emulsion being finally removed by drying.

b. Due to the fact that the pores are fine and uniform, the elasticity of this grinding tool is great, with the consequence that the surface of the material being ground is not scratched deeply, and moreover the loading of the grinding tool is small. Again, the presence of these pores assists the radiation of heat from the grinding tool. Thus, the grinding tool has a satisfactory heat resistance.

c. The binder used in this grinding tool is water resistant. The conventional polyvinyl acetal resin bonded grinding tools lacked water resistance and thus cooling water could not be used during the grinding operation, with the consequence that the binder was susceptible to fusion by the heat of the grinding operation to result in still greater wear of the grinding tool. In contrast, cooling water can be used in the case of the invention grinding tool, with the consequence that a still greater reduction of the wear of the grinding tool can be achieved.

d. As compared with the polyvinyl acetal resin bonded grinding tool, the invention grinding tool has a greater strength and modulus of elasticity. Hence, its grinding efficiency is much greater. The strength and modulus of elasticity of the invention grinding tool fall between those of the bakelite bonded grinding tool and the polyvinyl acetal resin bonded grinding tool. Hence, the invention grinding tool can be used for grinding much harder materials, for example, tempered steel, materials that were impossible of grinding by means of the polyvinyl acetal resin bonded grinding tools.

Thus, it is seen that the invention porous grinding tool possesses characteristics and advantages not seen in the case of the conventional porous grinding tools.

The present invention and a preferred embodiment thereof will now be more fully described below.

The uncured unsaturated polyester resin to be used in the invention process may be any that is usually used. The uncured unsaturated polyester resin, as is well known, is a viscous liquid mixture which is obtained by dissolving an unsaturated polyester in an unsaturated monomer for cross-linking the polyester, for example, styrene. The art of making a cured unsaturated polyester resin by curing an uncured unsaturated polyester resin in the presence of either a peroxide catalyst or a peroxide catalyst and a curing accelerator is well known, and the resulting cured resin finds wide applications. The unsaturated polyesters are usually prepared by the condensation reaction of an alpha, beta-unsaturated dibasic acid such, for example, as maleic anhydride, maleic acid, fumaric acid, itaconic acid, etc., with a glycol such, for example, as ethylene glycol, diethylene glycol, propylene glycol, neopentyl glycol, etc., and the condensate has a molecular weight of preferably 1,000–3000. As the unsaturated monomer that is used for cross-linking the unsaturated polyester, usable usually are the vinyl monomers such as styrene, vinyl toluene, divinylbenzene, vinyl acetate, acrylic esters, etc., styrene being especially preferred. The mixture of the unsaturated polyester and the unsaturated monomer for cross-linking is a water-insoluble, resinous oily mixture, usually mixed at a weight ratio of 80:20 to 30:70, and is called the uncured unsaturated polyester resin. Since this is so well known, it is believed that no further description in detail need be given.

The water-in-oil (W/O) emulsion of the uncured unsaturated polyester resin can be prepared by the agitation of a mixture of the resin and water in the presence of an emulsifier. The basic emulsifiers are preferably used, since the diameter of the water drops in the emulsion formed by their use becomes still more minute. As examples of these emulsifiers, included are the hydroxides of the alkali metals or the alkaline earth metals and the nitrogen-containing basic substances such as ammonia, hydrazine, alkylamines, alkanolamines and unsaturated amines. Of these, those which can form a structural membrane at the interface of the unsaturated polyester resin and water, for example, triethanolamine, are especially to be preferred. A weight ratio of resin to water in the range of 1:0.5 to 1:3, and preferably 1:0.7 to 1:1.5, is employed in the case of this resin-water mixture. The more the amount of water, the larger the pore volume of the grinding tool obtained as the final product. The conditions for forming the W/O emulsion varies depending upon the composition of the unsaturated polyester resin used and the basicity and amount of the emulsifier. Generally speaking, when the weight ratio of the uncured unsaturated polyester resin to water is 1:1, the diameter of the water drops contained in the emulsion in the zone where the amount of the emulsifier is relatively small is on the order of about 1–10 microns, whereas in the zone where the amount of the emulsifier is relatively great, the diameter of the water drops is on the order of about 0.1 micron. Since the water drops are removed during the drying step after the cure of the resin has been completed, this diameter determines the size of the pores of the grinding tool obtained as the final product. Thus, there is provided a porous grinding tool having pores of extremely minute size of the order of about 0.1–10 microns. In preparing the emulsion, a small amount of a volatile alcohol can be used along with the water to facilitate the subsequent drying.

The homogeneous mixture of the W/O emulsion and abrasive grains can be prepared by mixing and gently stirring these two components. The weight ratio of the emulsion to abrasive grains of this mixture is suitably in the range of 1:0.3 to 1:3, and preferably 1:0.5 to 1:1.5.

As the abrasive grains, any of the natural or man-made abrasive materials are usable, included being such as fused alumina, silicon carbide, diamond, emery, garnet, glass powder and the like. Further, the grain size can be varied over a wide range.

The mixture of the W/O emulsion of uncured unsaturated polyester resin and abrasive grains, after the addition of a small amount of a curing catalyst such, for example, as methyl ethyl ketone peroxide, benzoyl peroxide, dicumyl peroxide and azobisisobutyronitrile and its formation into a homogeneous mixture, is then molded into the intended grinding tool shape, for example, the shape of a grinding wheel. The resulting mold is then submitted to conditions that will cure the uncured unsaturated polyester contained therein. The resin is cured by gently heating with the assistance of the curing catalyst. Further, if a curing accelerator such as cobalt naphthenate, cobalt octoate, N,N'-dimethylaniline or diethanolaniline is added beforehand at the time of the preparation of the emulsion, the cure can be made to proceed at room temperature.

After completion of the cure, the water is removed therefrom by drying. The removal of the water can be carried out by heating and/or under reduced pressure. If heating is carried out at a point when cure has proceeded to a considerable extent, the completion of the cure and drying can be accomplished at the same time. Again, the removal of the water can also be carried out by leaving the mould to stand for a prolonged period at room temperature. The removal of the water need not necessarily be complete, since the grinding tool of the present invention demonstrates its excellent properties even though it contains some amount of water. However, if the final product is one which is thick and large, an insufficient removal of the water would be objectionable, since there is a tendency to the product gradually drying and becoming deformed during its use.

Thus, as described hereinbefore, the invention process makes it possible to readily make a porous, cured unsaturated polyester resin bonded grinding tool having the desired excellent properties without involving any complicated steps whatsoever. Further, it becomes possible according to the invention process to adjust the size of the fine pores as well as the pore volume, with the consequence that it becomes possible to adapt the elasticity and hardness of the grinding tool to meet the requirements of varying applications.

The following examples will now be given for more fully illustrating the invention. The diameter of the pores was examined with a scanning type electron microscope.

EXAMPLE 1

To 100 grams of an uncured unsaturated polyester resin containing 30% of styrene (a condensate of maleic anhydride and diethylene glycol) are added 2 grams of cobalt octoate as curing accelerator and 3 grams of triethanolamine as emulsifier and, after placing this mixture in a mixer, 180 milliliters of water is slowly added dropwise thereto with stirring, whereupon there is obtained a W/O type white emulsion of high viscosity.

Three hundred grams of a green silicon carbide material JIS No. 120 of a particle size all passing through a 177-micron mesh screen is then poured into the foregoing emulsion, and the grain surfaces are thoroughly wetted with gentle stirring. Next, 2 grams of methyl ethyl ketone peroxide, a hardener, is added, and the mixture is stirred. The resulting homogeneous mixture is then poured into a doughnut-shaped mold having an outside diameter of 127 millimeters and core diameter of 31.7 millimeters and cured by allowing to stand for 12 hours at room temperature. This is followed by drying the resulting mold for 12 hours at 80°C. to complete the cure as well as remove the water therein, after which the side and peripheral surfaces of the grinding wheel are finished with a diamond dresser. Thus, a porous, resin bonded grinding wheel having a pore size of about 2–5 microns, a pore volume of 50 percent, a specific gravity of 1.20, a flexural strength of 65 kg/cm$^2$ and a modulus of elasticity of 5 × 10$^3$ kg/cm$^2$ is obtained. The water content of the resulting grinding wheel was about 16 percent of that used in preparing the emulsion.

A rotational test of the so obtained grinding wheel was conducted at 8000 rpm, but no abnormalties were noted. A plane grinding test was conducted under the following conditions:

```
Grinder speed:     3780 rpm
Grinding method:
   Speed of later feed: 4 meters per minute
   Speed of to-and-fro feed: 2 millimeter per pass
Grindstone dimensions:
   124.7 millimeters × 18.6 millimeters × 31.8 millimeters
   (outside diameter)  (thickness)   (hole diameter)
Grinding liquid:
   Aqueous grinding liquid (40 times)
   Amount fed: 1.5 liters per minute
Material ground: Soft steel (SS 41)
Infeed: 10 microns   10 times
         5 microns    2 times
Sparking out:   2 times
```

The results of the grinding test were as follows:
 Amount ground:834 milligrams
 Wear of grindstone:410 milligrams
 Average roughness of the surface of ground material:0.14 micron

EXAMPLE 2

Example 1 is repeated except that the amount of water added in preparing the emulsion is changed to 100 milliliters and the amount of the green silicon carbide grains of JIS No. 120 is changed to 380 grams. The so obtained grinding wheel has a specific gravity of 1.68, a pore size of about 1–2 microns, a pore volume of 33 %, a flexural strength of 180 kg/cm$^2$ and modulus of elasticity of 9 × 10$^3$ kg/cm$^2$. When the same grinding test as that of Example 1 was carried out, the results obtained were as follows:
 Amount ground:492 milligrams
 Wear of grindstone:320 milligrams
 Average roughness of the surface of ground material:0.10 micron

EXAMPLE 3

To 100 grams of an uncured unsaturated polyester resin containing 30 % of styrene (a condensate of maleic anhydride and diethylene glycol) are added 2 grams of cobalt naphthenate as curing accelerator and 5 grams of triethylamine as emulsifier followed by slowly adding dropwise 120 milliliters of water with stirring to obtain a creamy W/O emulsion. Three hundred grams of a brown, fused alumina type grinding material JIS No. 1200 (particle size 13-microns) are then admixed with the resulting emulsion and, after adding 2 grams of methyl ethyl ketone peroxide, a hardener, the mixture is made into a grinding wheel as in Example 1. The so obtained grinding wheel has a specific gravity of 1.56, a pore size of about 0.1 micron, a pore volume of 42 %, a flexural strength of 220 kg/cm$^2$ and a modulus of elasticity of 2 × 10$^4$ kg/cm$^2$. When the same grinding test as that of Example 1 was carried out, the following results were obtained.
 Amount ground:120 milligrams
 Wear of grindstone:90 milligrams
 Average roughness of the surface of ground material:0.02 micron

EXAMPLE 4

To 100 grams of an unsaturated polyester resin containing 35 % of styrene (condensate of fumaric acid and bisphenol A) are added 1.0 grams of cobalt naphthenate as curing accelerator and 1.0 gram of N,N'-dimethylaniline, to which mixture is then added 200 grams of a brown, fused alumina type grinding material JIS No. 220 of a particle size all passing through a 105-micron mesh screen. This is followed by slowly adding dropwise to this mixture with stirring a solution in 100 grams of water of 0.8 gram of triethanolamine. After completion of the dropping, 1.0 gram of a methyl ethyl ketone peroxide solution is added, and by operating as in Example 1 a grinding wheel is obtained. The so obtained grinding wheel has a specific gravity of 1.38, a pore size of about 1.0 micron, a pore volume of 45 %, a flexural strength of 240 kg/cm$^2$ and a modulus of elasticity of 8 × 10$^3$ kg/cm$^2$.

The so obtained grinding wheel was submitted to the same grinding test as that described in Example 1, using as the material to be ground a tempered structural carbon steel (S45C) having a tempered hardness of 38 on the Rockwell C scale. The results obtained are shown below.
 Amount ground:820 milligrams
 Wear of grindstone:370 milligrams
 Average roughness of the surface of ground material:0.08 micron

EXAMPLE 5

The experiment is operated exactly as in Example 4 but using as the brown, fused alumina JIS No. 500 (particle size 34 microns) to obtain a grinding wheel. The so obtained grinding wheel has a specific gravity of 1.42, a pore volume of 45 percent, a pore size of about 1.0 micron, and its flexural strength is 255 kg/cm$^2$ and modulus of elasticity is 9 × 10$^3$ kg/cm$^2$.

When this grinding wheel was tested as in Example 1, using as the material to be ground that used in Example 4, the following results were obtained.
 Amount ground:260 milligrams
 Wear of grindstone:210 milligrams
 Average roughness of the surface of ground material:0.04 micron

What is claimed is:
1. A process for making a porous, resin bonded grinding tool, said process comprising molding a homogenous mixture consisting of abrasive grains, a water-in-oil emulsion of an uncured unsaturated polyester resin and a curing catalyst for said unsaturated polyester resin, wherein the weight ratio of water-in-oil eumulsion to abrasive grains contained in said homogeneous mixture ranges from about 1:0.3 to about 1:3 and wherein said resin and water contained in the water-in-oil emulsion are mixed at a weight ratio of resin to water of about 1:0.5 to about 1:3 to form a mold of the intended grinding tool shape, curing said unsaturated polyester resin contained in the mold, and drying the thus obtained mold to remove the water therefrom.

2. The process of claim 1 wherein the weight ratio of water-in-oil emulsion to abrasive grains contained in said homogeneous mixture ranges from about 1:0.5 to about 1:1.5.

3. The process of claim 1 wherein said resin and water contained in the water-in-oil emulsion are mixed at a weight ratio of resin to water of about 1:0.7 to about 1:1.5.

* * * * *